United States Patent

[11] 3,579,086

| [72] | Inventor | Paul Lebenbaum, Jr.<br>2531 Blackthorn, Newport Beach, Calif. 92660 |
|---|---|---|
| [21] | Appl. No. | 834,644 |
| [22] | Filed | June 19, 1969 |
| [45] | Patented | May 18, 1971 |

[54] FREQUENCY CONVERSION CYCLOCONVERTER SYSTEM FOR BOTH SINGLE- AND MULTI-PHASE APPLICATIONS
10 Claims, 12 Drawing Figs.

| [52] | U.S. Cl. | 321/60, 321/66, 321/69 |
|---|---|---|
| [51] | Int. Cl. | H02m 5/30 |
| [50] | Field of Search | 321/7, 11, 13, 60, 61, 65, 68, 69, 27; 318/227, 230, 231 |

[56] References Cited
UNITED STATES PATENTS

| 1,158,474 | 11/1915 | Fortescue | 321/27X |
|---|---|---|---|
| 2,264,854 | 12/1941 | Mittag | 321/66X |
| 3,297,937 | 1/1967 | Benchimol | 321/60 |
| 3,324,375 | 6/1967 | Pearce | 321/7 |
| 1,939,455 | 12/1933 | Livingston | 321/66X |
| 3,246,231 | 4/1966 | Clarke | 321/69 |
| 3,332,001 | 7/1967 | Schwarz | 321/11 |
| 3,355,647 | 11/1967 | Braus | 318/227X |
| 3,467,850 | 9/1969 | Christiansen et al. | 321/13UX |

FOREIGN PATENTS

| 314,132 | 7/1956 | Switzerland | 321/66 |
|---|---|---|---|

Primary Examiner—William H. Beha, Jr.
Attorney—Fowler, Knobbe & Martens

ABSTRACT: A device for variably decreasing the frequency of a power source by selectively reversing the polarity of the power source voltage applied to a load, wherein the output of the power source and the output of a signal generator, in conjunction, control the polarity of the voltage applied to the load. Such polarity control avoids short circuiting of the power source, reduces circuit complexity, and utilizes power taken directly from the power source output for controlling the polarity switching members. The output voltage of the device may be made proportional to the output frequency, and the device may be utilized in either single- or multi-phase circuits.

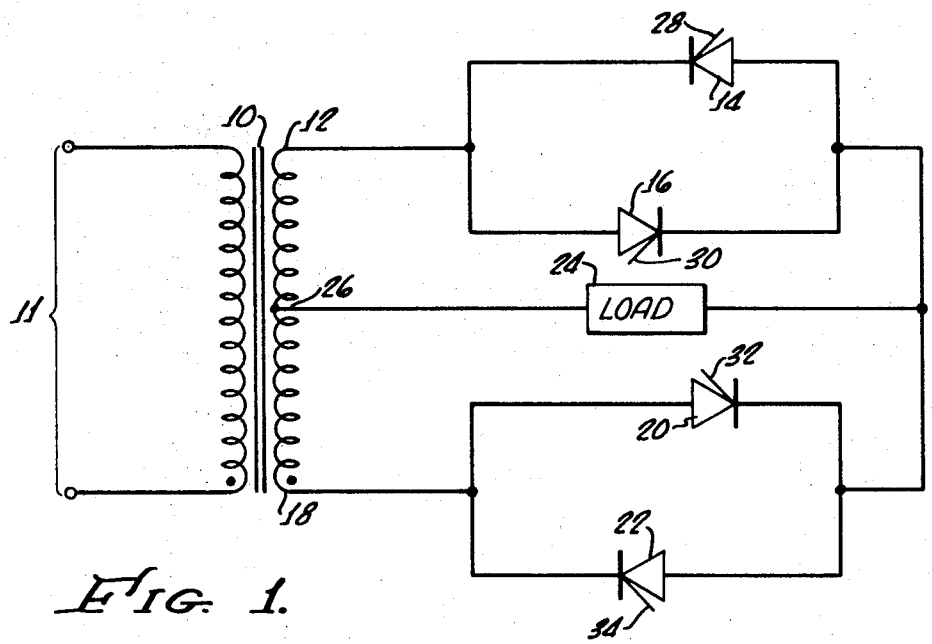
FIG. 1.
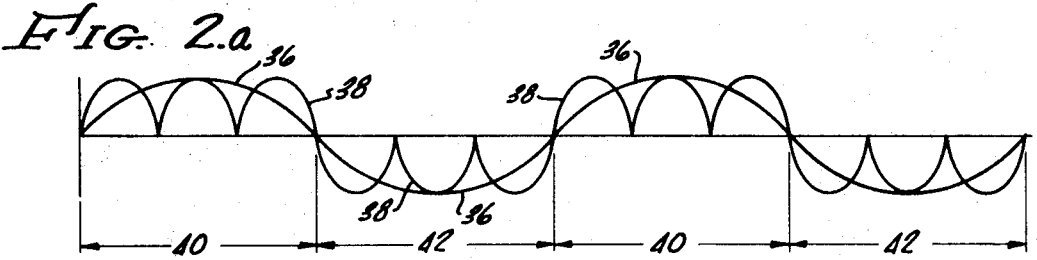
FIG. 2a.
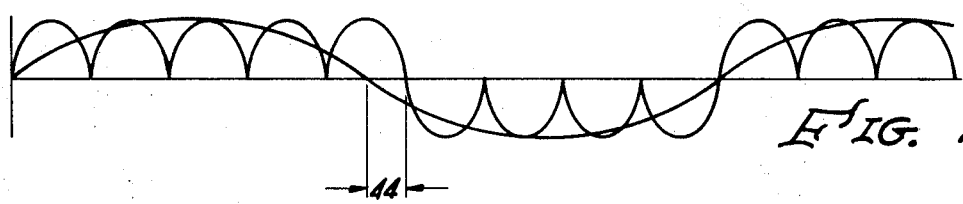
FIG. 2b
FIG 2c
INVENTOR.
PAUL LEBENBAUM, JR.
BY
FOWLER, KNOBBE
& MARTENS
ATTORNEYS.

INVENTOR.
PAUL LEBENBAUM, JR.

BY
FOWLER, KNOBBE
& MARTENS
ATTORNEYS.

INVENTOR.
PAUL LEBENBAUM, JR.
BY
FOWLER, KNOBBE
& MARTENS
ATTORNEYS.

INVENTOR.
PAUL LEBENBAUM, JR.

BY
FOWLER, KNOBBE
& MARTENS
    ATTORNEYS.

FREQUENCY CONVERSION CYCLOCONVERTER SYSTEM FOR BOTH SINGLE- AND MULTI-PHASE APPLICATIONS

This invention applies to the field of cycloconverters, which are devices for changing the frequency of a power source.

Many industrial and military equipments require variable-speed drive systems and it is often advantageous for such systems to produce a constant torque regardless of speed. The most successful attempts in the prior art to achieve an electrically adjustable speed, constant-torque drive have been through the use of a DC motor, the armature voltage of which was obtained from either a DC-DC or AC-DC converter. In such a system the speed of the motor is varied by changing the output voltage of the converter, while the inherent characteristics of the DC motor provided the constant torque required by the load. However, because of commutation requirements of a DC motor, both initial cost and maintenance cost of such systems are higher and the reliability is substantially lower than in systems using the much simpler squirrel cage AC induction motor as the driving element.

There are two electrical methods which have been used to reduce the speed of AC squirrel cage motors. The simplest has been to apply a reduced voltage to the motor without changing the motor frequency and thus to increase the slip frequency of the motor and reduce its speed. If the torque characteristic of the load is constant, high rotor losses are generated at the higher slip frequencies (lower motor speeds) and oversized motors must be used to reduce heating. This characteristic increases the cost of this type of drive and limits its application if size and weight are limiting factors.

The other method has been to use variable frequency power sources such as adjustable speed AC generator sets or static electronic inverters or converters such as the cycloconverter.

The basic cycloconverter circuit for single-phase applications includes a pair of full wave rectifier circuits, each of which can be selectively energized or deenergized. One of these full wave rectifier circuits is designed to produce a fully rectified power output having a given polarity The other full wave rectifier circuit produces a full wave rectified power output, but with the opposite polarity. By properly controlling the energization and deenergization of each of the full wave rectifier circuits, it is possible to produce a power output which periodically changes polarity and has a period which is longer than that of the input AC signal. Such a device can therefore produce an output voltage at a frequency which is determined by the period between polarity changes, rather than by the period of the input AC signal. Although the cycloconverter circuit has long been considered to be well adapted to frequency conversion at high power levels, and especially for adjustable speed AC motor drive systems, a number of problems have made prior-art systems highly unreliable, expensive and susceptible to catastrophic failure of the rectifying elements. In addition, high-power applications require large rectifying elements which, in turn, require considerable power for their gating circuits. Prior-art gating circuits are powered directly from a separate signal generator. Therefore, in order to optimize the circuit design, each different power application requires a different size signal generator and gating circuit.

One of the most difficult problems of the prior-art circuits is caused by the nature of the rectifying elements themselves. Controllable rectifying elements, such as silicon controlled rectifiers (SCR), begin to conduct current from their anode to cathode only if both the anode and the gate are made positive with respect to the cathode. However, once the current is flowing from the anode to the cathode the flow will be maintained regardless of the potential on the gate so long as the anode remains positive relative to the cathode. This characteristic often causes prior-art devices to short circuit when they are connected either to a resistive load or to a motor or other load having an inductive component causing the load current to reduce to zero at a later time than the load voltage. Thus, when the control circuit changes the gate potential to deenergize one full wave rectifier circuit and energize the full wave rectifier circuit of opposite polarity, the deenergized full wave rectifier circuit remains in a conductive state either because the change in gate potential occurs after the deenergized rectifier circuit starts to conduct during a half cycle of the input power waveform and thus continues to conduct until the current therethrough is reduced to zero or because the current in the inductive load continues after the rectifier circuit of opposite polarity is energized. These conditions produce a conductive state in both full wave rectifier circuits and results in a short circuit across the input power line. Such a short circuit causes extremely high current to flow in the rectifying elements, often causing them to catastrophically fail unless expensive external means are used to prevent such circuit conditions.

In order to achieve a constant-torque driving system using a cycloconverter with an AC squirrel cage motor, it is necessary to reduce the voltage applied to the drive system as the frequency is reduced. This is most commonly accomplished by maintaining the ratio of volts/frequency constant by some electronic means. In the prior-art systems complex circuitry has been used to shape the voltage waveform of the power source in order to reduce the resultant net voltage output of the cycloconverter. Such wave shaping requires a circuit completely separate from the basic cycloconverter gating circuit since the reduction in voltage is accomplished by changing the voltage of the input power frequency, rather than changing the voltage of the cycloconverter output frequency. This approach to voltage/frequency control has further complicated prior-art circuits.

In addition, since the prior-art devices, in order to avoid the short circuit problem discussed previously, synchronized their gating circuits with the input power signal, when these systems were expanded to multiphase operation it was necessary, in each of the basic cycloconverter circuits which were used for the various output phases, to synchronize the gating circuits with all of the input phases. It was therefore customary to derive each of the output phases from a multiphase cycloconverter which rectified and reversed the polarity of all of the input phases. Such a system adds greatly to the complexity of multiphase cycloconverter circuits in that the gating and synchronizing circuits for each of the output phase cycloconverters must be derived from a combination of input phases, and the number of actual rectifying elements per output phase must be increased as the number of phases is increased. Stated differently, a three-phase cycloconverter in the prior-art systems is far more complex than would be three single-phase cycloconverters using the prior-art techniques.

The present invention includes a novel circuit which inherently protects the power-rectifying elements from the line short circuit condition described above or caused by inaccurate control of the polarity reversal process by making simultaneous energization of a pair of full wave rectifier circuits impossible. In addition, the present circuit utilizes a control circuit which can control any full wave rectifier circuit regardless of power requirements, since the power which is required to gate the rectifying elements is derived directly from the input power source, rather than from the control circuitry itself. The present circuit also includes an inherent control which will vary the output voltage of the cycloconverter as the output frequency is varied without complex circuitry for shaping the input power waveform, so that when connected to an AC motor the rated output torque of the motor will remain constant regardless of the motor speed.

An additional advantage of the present circuit is that it may be used in multiphase applications without an increase in the number of power rectifying and control components per phase, as was required in prior-art cycloconverters.

These and other advantages of the present invention may best be understood by reference to the drawings in which:

FIG. 1 is a schematic illustration of the basic cycloconverter circuit with the control circuits deleted for clarity;

FIG. 2 is a plot of the changes in voltage across the load of FIG. 1 with time;

Figure 3:
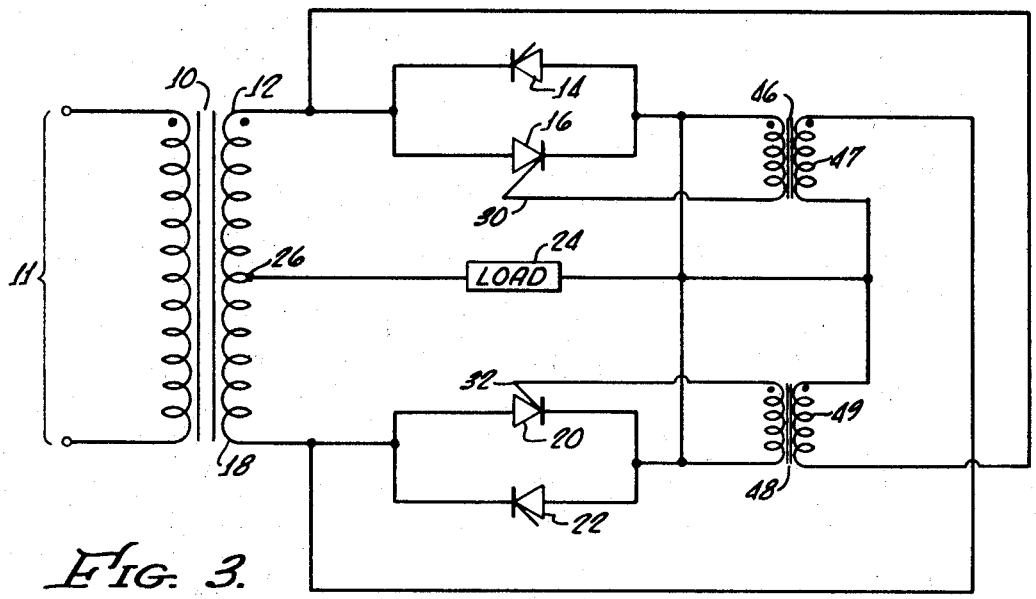
FIG. 3 is a schematic illustration of the cycloconverter with that portion of the control circuit which eliminates the type of line short circuits described above as applied to two power-rectifying elements, one from each full wave rectifier circuit of opposite polarity. The remainder of the control circuitry has been deleted for clarity.

Referring first to FIG. 1, the operation of the basic cycloconverter circuit may be described. The signal from a power source is applied to the primary 11 of a transformer 10 which has a center tapped secondary winding. One end 12 of the secondary winding is connected to a pair of power silicon controlled rectifiers 14 and 16 which are connected to allow current flow in opposite directions from the end 12 of the transformer secondary. Likewise, the other end 18 of the transformer secondary is attached to a second opposing pair of power silicon controlled rectifiers 20 and 22. THe other end of each of the power silicon controlled rectifiers 14, 16, 20 and 22 is connected to one terminal of the load 24, which is to be driven by the cycloconverter. The other end of this load 24 is connected to the center tap 26 of the transformer secondary. The circuits for energizing the gates 28, 30, 32 and 34 of each of the power silicon controlled rectifiers 14, 16, 20 ad 22, respectively, have been deleted from this drawing to facilitate a clear understanding of the conducting and blocking operation of the power silicon controlled rectifiers themselves.

In order that a silicon controlled rectifier such as those shown at 14, 16, 20 and 22 may conduct current when the potential of its anode is more positive than that of its cathode, the gate of these elements, 28, 30, 32 and 34, respectively, must be a potential which is more positive than that of the respective cathode of each of these silicon controlled rectifiers. Once the gates of these silicon controlled rectifiers. Once the gates of these silicon controlled rectifiers are energized these elements will conduct current from anode to cathode in the same manner as a simple rectifier.

The power silicon controlled rectifiers 14, 16, 20 and 22 function in pairs, each pair 16–20 and 14–22 operating as a full wave rectifier on the signal induced in the secondary of the transformer 10. Assume the potential of the gates 30 and 32 of silicon controlled rectifiers 16 and 20 is made positive with respect to the potential of their respective cathodes, while the potential of the gates 28 and 34 of silicon controlled rectifiers 14 and 22 is made equal to or negative with respect to the potential of their respective cathodes. In this state, the silicon controlled rectifiers 16 and 20 are considered to be energized, while the silicon controlled rectifiers 14 and 22 are considered to be deenergized. Under these conditions, when the voltage induced in the end 12 of the transformer secondary is more positive than that induced in the end 18 of the transformer secondary, the silicon controlled rectifier 16 will conduct current from the end 12 of the transformer secondary through the load 24 to the center tap 26, while the silicon controlled rectifiers 14 and 20 will not conduct current since the potential of their anodes is negative with respect to that of their cathodes, and silicon controlled rectifier 22 will not conduct current since the potential of its gate 34 is not positive with respect to that of its cathode. When the polarity of the voltage induced on the secondary of the transformer 10 is such that the voltage on the end 18 of the transformer secondary is more positive than that induced on the end 12 of the transformer secondary, the silicon controlled rectifier 20 will conduct current from the end 18 of the transformer secondary through the load 24 to the center tap 26. The silicon controlled rectifiers 16 and 22 will not conduct since the potential of their anodes is negative with respect to that of their cathodes, and silicon controlled rectifier 14 will not conduct current since the potential of its gate 28 is not not positive with respect to that of its cathode. THerefore, in this state, during each half cycle of the AC signal induced on the secondary of the transformer 10, the cycloconverter will conduct current through the load 24 and into the center tap 26.

Likewise, if the silicon controlled rectifiers 16 and 20 are deenergized and the silicon controlled rectifiers 14 and 22 are energized, the cycloconverter circuit will conduct a fully rectified version of the signal induced in the secondary of the transformer 10 through the load 24, except that in this case this rectified current will flow out of the center tap 26 through the load 24. Therefore, by energizing either the silicon controlled rectifiers 16 and 20 with the silicon controlled rectifiers 14 and 22 deenergized, or by energizing the silicon controlled rectifiers 14 and 22 with the silicon controlled rectifiers 16 and 20 deenergized, a fully rectified power signal may be applied to the load 24 with the polarity of the signal controlled by proper energization of the pair of silicon controlled rectifiers to be made conducting.

If we now assume that a low frequency sine wave voltage is applied to the gates 28, 30, 32 and 34 in such a manner that when gates 30 and 32 are made positive with respect to the cathodes of silicon controlled rectifiers 16 and 20, gates 28 and 34 are made negative with respect to the cathodes of silicon controlled rectifiers 14 and 22; only silicon controlled rectifiers 16 and 20 can conduct when the polarity of their anodes becomes positive with respect to their cathodes. Thus, under this condition, current can only flow from the ends 12 and 18 of the secondary of the transformer 10 through the load 24 into the center tap 26. Conversely, when the polarity of the low frequency sine wave voltage reverses, current can only flow from the center tap 26 through the load 24 into the ends 12 and 18 of the secondary of the transformer 10. THerefore, by alternately energizing and deenergizing the pairs of silicon controlled rectifiers 14–22 and 16–20, it is possible to supply an alternating voltage to the load 24, the frequency of which is equal to the frequency supplied by the low frequency oscillator to the silicon controlled rectifier gates 28, 30, 32 and 34.

This polarity reversal is best understood by reference to FIG. 2. FIG. 2a is a representation of the voltage applied to the load 24 with time, assuming that the frequency of the power signal induced in the secondary of the transformer 10 is 60 cycles per second and the frequency of the low frequency oscillator which is applied to the gates 28, 30, 32 and 34 is 20 cycles per second. In this case the low frequency signal is shown as 36 on the graph, while the voltage to the load 24 is shown as 38. As shown, after three half cycles of the 60 cycle per second voltage are induced in the secondary of the transformer 10, the low frequency oscillator causes a polarity reversal to occur by deenergizing one pair of silicon controlled rectifiers and energizing the other. Therefore, during the periods indicated in FIG. 2a as 40, the silicon controlled rectifiers 16 and 20 are energized while the silicon controlled rectifiers 14 and 22 are deenergized. During the periods shown as 42, the silicon controlled rectifiers 14 and 22 are energized while the silicon controlled rectifiers 16 and 20 are deenergized.

FIGS. 2b and 2c represent a similar polarity reversal, except that in FIG. 2b the frequency of the low frequency oscillator is 13⅓ cycles per second, and in FIG. 2c the frequency of the low frequency oscillator is 30 cycles per second. Thus, it will be seen that by varying the frequency of the low frequency oscillator, the polarity of the fully rectified signal from the secondary of the transformer 10 can be made to reverse at a rate which is below the basic frequency of the input power source.

One of the problems of prior-art cycloconverters may best be described by reference to FIG. 2b. It can be seen that, in the situation where polarity reversal of the low frequency oscillator does not coincide with the null point in the fully rectified input power voltage wave, a situation occurs where the low frequency oscillator will require a polarity reversal during the conduction cycle of one pair of silicon controlled rectifiers. This period of time is shown as 44 in FIG. 2b. Due to the inherent nature of silicon controlled rectifiers and other controllable rectifier devices, once current is being conducted from the anode to the cathode, reversing the polarity of the gate circuit to make it more negative than the cathode will not interrupt this current flow, and the current flow will cease only when the potential between the anode and the cathode reaches a null point. Therefore, as in FIG. 2b, when the low frequency oscillator reaches its null point while one of the silicon controlled rectifiers, 16 and 20, is conducting, this rectifier will maintain its conductive state through the remainder of the half cycle of the induced power supply signal. However, the polarity of the gate signals applied to silicon controlled rectifiers, 14 and 22, will allow one of them to conduct during this same half cycle. In such a situation, where both pairs of silicon controlled rectifiers are allowed to be in a conductive state a short circuit will occur across the secondary of the transformer 10 enabling high currents to pass through the silicon controlled rectifiers, possibly resulting in severe damage to these elements unless expensive current-limiting devices are used. For example, if silicon controlled rectifier 16 is conductive and polarity reversal of the low frequency oscillator drives silicon controlled rectifier 22 into a conductive state, current can pass directly from the end 12 of the transformer secondary through silicon controlled rectifier 16 and silicon controlled rectifier 22 to the other end 18 of the transformer secondary, bypassing the load 24. A feature of this invention is the avoidance of simultaneous energization of opposing full wave rectifier systems without using complex timing circuits. This is done through a novel control circuit connection which allows the silicon controlled rectifiers in one full wave rectifier system to be energized only if the current in the opposing full wave rectifier system has ceased to flow.

FIG. 3 illustrates that portion of the control circuit which avoids cycloconverter short circuits by cross-connecting the gate control circuits of the opposing full wave rectifier systems. Only the elements which control silicon controlled rectifiers 16 and 20 are shown in order to make the description and the drawing as clear as possible. These elements comprise a pair of transformers 46, 48, the primaries of which, 47 and 49, respectively, are connected from anode to cathode of the opposing silicon controlled rectifier pairs 20-22 and 14-16, respectively, and the secondaries of which supply the energizing current to respective gates 30, 32 of silicon controlled rectifiers 16 and 20.

The control circuitry shown in FIG. 3 prevents energization of the silicon controlled rectifiers 16 and 20 until the silicon controlled rectifiers 14 and 22 become nonconducting, or, as seen in FIG. 2b, until the end of the period 44 when the rectified input signal reaches a null point. This delay in the energization of silicon controlled rectifiers 16 and 20 is accomplished as follows: Assume that the end 12 of the transformer secondary is induced with a potential which is more positive than that induced in the end 18 of the transformer secondary, that the silicon controlled rectifiers 14 and 22 are energized, and that the silicon controlled rectifiers 22 is conducting current from the center tap 26 through the load 24. Further assume that the low frequency oscillator (not shown in FIG. 3) crosses its null point and enables the gates 30 and 32 of the silicon controlled rectifiers 16 and 20, respectively, to be energized. Such energization will occur only if a voltage is induced in the secondary windings of transformers 46, 48 which are connected to the gates 30 and 32. Since the primary 47 of the transformer 46 is connected in parallel with the silicon controlled rectifier 22, so long as this silicon controlled rectifier 22 is conducting current through the load 24 there can be no appreciable voltage drop across this silicon controlled rectifier 22 and, therefore, no voltage applied to the gate 30. The gate 30 of the silicon controlled rectifier 16 is thus cross-connected with the silicon controlled rectifier 22 such that the silicon controlled rectifier 16 can not become conductive until the silicon controlled rectifier 22 has ceased to conduct current and has become nonconductive, at which time a voltage is produced on the primary 47 of transformer 46. Likewise, the gate 32 of the silicon controlled rectifier 20 is connected across the silicon controlled rectifier 14 through the transformer 48 and can not become conductive until the silicon controlled rectifier 14 is no longer conducting current. Therefore, if the silicon controlled rectifier 22 is conducting current through the load 24 and the low frequency oscillator changes polarity to allow energization of the silicon controlled rectifier 16, such energization will be delayed until the silicon controlled rectifier 22 has become nonconductive, i.e., at the end of the period 44 in FIG. 2b. At this point it is safe for the silicon controlled rectifier 16 to become conductive since the anode of silicon controlled rectifier 22 will then be negative with respect to its cathode and the silicon controlled rectifiers 16 and 22 can not cause a short circuit across the secondary of transformer 10. It should be understood that the gate circuit of the silicon controlled rectifier 14 is likewise cross-connected to the silicon controlled rectifier 20 and the gate circuit of the silicon controlled rectifier 22 is cross-connected to the silicon controlled rectifier 16 by similar control circuitry so that each of the silicon controlled rectifiers is maintained in a nonconductive state until the opposing silicon controlled rectifier in the opposite silicon controlled rectifier pair, which could present a short circuit across the transformer 10, is nonconductive.

Figure 4:
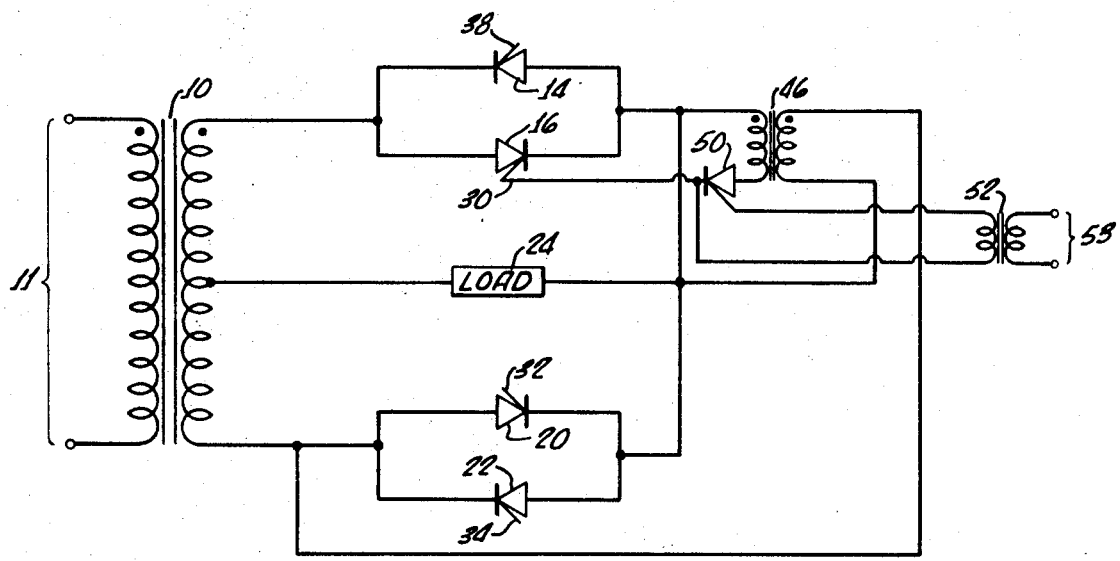
FIG. 4 is a schematic illustration of the control circuit for one power-rectifying element utilizing a low frequency oscillator for control of the polarity reversal process and the input power source for the synchronized gating of the power rectifying elements. The remainder of the control circuitry has been deleted for clarity.

Referring now to FIG. 4, the method for connecting the low frequency oscillator to enable the power from the cross-connecting transformers to energize the gate circuits of the silicon controlled rectifiers will be described. Since all of these circuits function identically, only the enabling circuit for the gate 30 of the silicon controlled rectifier 16 will be described. A silicon controlled rectifier 50 is inserted in the circuit from the transformer 46 to the gate 30. When energized, the silicon controlled rectifier 50 allows current from the transformer 46 to energize the gate 30 of the silicon controlled rectifier 16. This silicon controlled rectifier 50 is energized by current from the secondary of the transformer 52, the primary 53 of which is connected across the low frequency oscillator. Therefore, in order for the silicon controlled rectifier 16 to become conductive, the silicon controlled rectifier 50 must be conductive and there must be an induced voltage in the secondary of the transformer 46 caused by nonconduction of the silicon controlled rectifier 22, as described earlier. Such a circuit has two principal advantages. The power which is used to drive the silicon controlled rectifier 16 into conduction is derived directly from the primary power source through the connection of the primary 47 of transformer 46 across the silicon controlled rectifier 22. The silicon controlled rectifier 16 is also protected from short circuit with the silicon controlled rectifier 22 by this same transformer 46, and the control oscillator is used only as an enable circuit to allow polarity reversal at a time which is determined by the signal induced on the secondary of the transformer 46. During the periods 40 of FIG. 2a, the enabling silicon controlled rectifiers in gate circuits 30 and 32 are energized by the low frequency oscillator. During the periods 42 of FIG. 2a, the enabling silicon controlled rectifiers of gate circuits 28 and 34 are energized.

Figure 5:
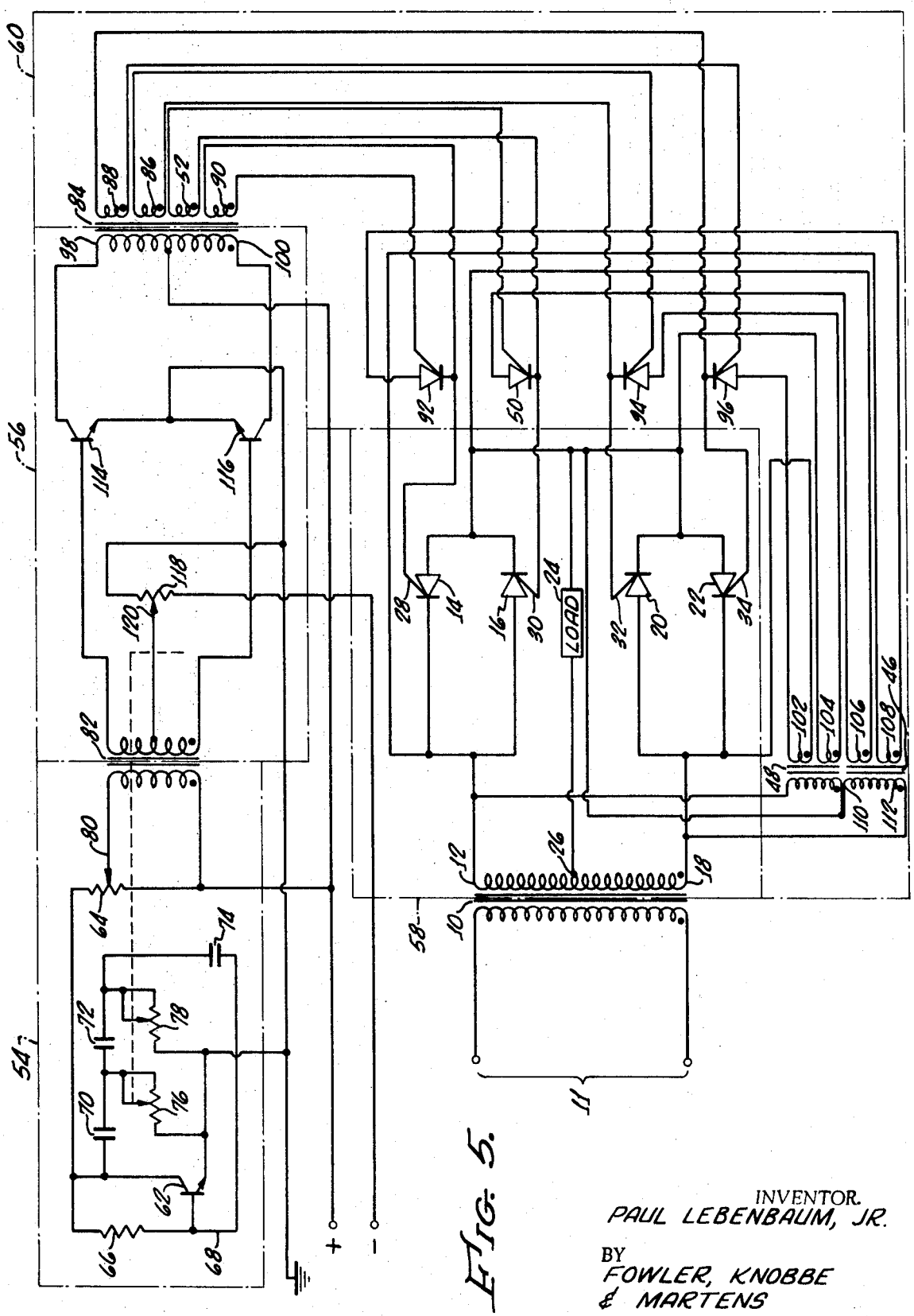
FIG. 5 is a schematic illustration of the complete single-phase cycloconverter including the low frequency oscillator, the low frequency wave-shaping circuit and the control circuits.

Referring now to FIG. 5, the complete circuit for the cycloconverter includes a low frequency oscillator such as the phase shift type oscillator 54, which is transformer coupled to a wave-shaping or voltage/frequency control circuit 56, which in turn is transformer coupled to the gate circuits of the series of silicon controlled rectifiers which act as enabling members for the polarity reversal within the cycloconverter. The basic cycloconverter circuit 58 is transformer coupled to the input power source, which also drives the transformer primaries in the control circuit 60. The circuit will first be described ignoring the function of the wave-shaping circuit 56, that circuit to be described in detail later.

The phase shift type oscillator 54 functions as follows: A basic amplifier circuit including a transistor 62, the collector of which is connected through a resistor 64 to a positive DC voltage supply, and the emitter of which is connected to ground, is base biased through a resistor 66 and its own output, which is fed back through line 68. The output of the amplifier, before being fed back, is phase shifted by the circuit which includes series capacitors 70, 72 and 74, the interconnections of which are grounded through the variable resistors 76 and 78. Oscillation will occur at the frequency at which there is a 360° total phase shift, 180° of which is furnished by the grounded emitter amplifier and 180° of which is furnished by the phase shift network. By varying the values of the variable resistors 76 and 78, the frequency at which this 360° total phase shift will occur may be changed, and therefore the oscillation frequency of the oscillator may be varied. The output of the oscillator is derived from a movable slide 80 on the resistor 64, and is therefore a function of the collector to emitter current in the transistor 62. This output is transformer coupled in the transformer 82 to the wave-shaping circuit, but for the present description may be considered to be coupled directly to the transformer 84 at the output of the wave-shaping circuit 56.

A sine wave voltage is induced in the secondaries of the transformer 84, the frequency of which may be varied by changing the value of the variable resistors 76 and 78. These transformer secondaries 52, 86, 88 and 90 each produce the same type of gate voltage for the enabling silicon controlled rectifiers 50, 94, 96 and 92, as was described for the transformer 52 and the silicon controlled rectifier 50 in reference to FIG. 4. Therefore whenever the end 98 of the primary of the transformer 84 is positive, and the end 100 of the primary of the transformer 84 is negative, the silicon controlled rectifiers 50 and 94 are energized to a conductive state, while the silicon controlled rectifiers 92 and 96 are deenergized and therefore nonconductive. Likewise, when the end 100 of the primary of the transformer 84 is positive and the end 98 is negative, silicon controlled rectifiers 92 and 96 are conductive while silicon controlled rectifiers 50 and 94 are nonconductive. Stated in another way, the pairs of silicon controlled rectifiers 92, 96 and 50, 94 are alternately conductive, the period of their cyclical change being determined by the frequency of the oscillator 54.

The input power from the power source, the frequency of which is to be changed, is connected to the primary 11 of the transformer 10 and, as was described with reference to FIG. 3, a pair of transformers 46 and 48 are connected across the silicon controlled rectifier pairs in the cycloconverter. The secondaries of these transformers 102, 104, 106 and 108 are connected to supply current to the gate circuits of the silicon controlled rectifiers 22, 20, 16 and 14 in such a polarity that the gate and anode of each silicon controlled rectifier are positive with respect to the cathode at the same time. That is, whenever the end 110 of the primary of the transformer 46 is more positive than the end 112 of this primary the gate circuit 30 of the silicon controlled rectifier 16 will be made more positive than the cathode of silicon controlled rectifier 16 and, since the end 12 of transformer 10 is also more positive than the end 18, the silicon controlled rectifier 16 is ready to go into the conductive state. However, since the enabling silicon controlled rectifier 50 is interposed in this gate circuit, the silicon controlled rectifier 16 will not be energized unless both the end 110 of the primary of the transformer 46 is more positive than the end 112, and the silicon controlled rectifier 50 is made conductive by the end 98 of the primary of the transformer 84 being more positive than the end 100. The gate circuits for the silicon controlled rectifiers 14, 20 and 22 function in the same manner, each requiring a given polarity on the transformer 84 and a given polarity on either the transformer 46 or the transformer 48 to become energized.

It can be seen that the power for the gate energization of each of the respective silicon controlled rectifiers 14, 16, 20 and 22 is derived directly from the transformers 46 and 48 with the transformer 84 used as an enabling circuit. This use of power derived directly from the input power lines to gate the silicon controlled rectifiers allows use of the control circuit which is shown with a variety of cycloconverter output power requirements by merely changing the main power silicon controlled rectifiers 14, 16, 20 and 22 to meet the specific load requirements. In addition, by deriving this line excitation signal from the voltage across an opposing silicon controlled rectifier, each of the silicon controlled rectifiers is protected from being energized at a time when its energization would cause a cycloconverter short circuit, i.e., silicon controlled rectifiers 14 and 20 or 16 and 22 can not be simultaneously energized.

Figure 7:
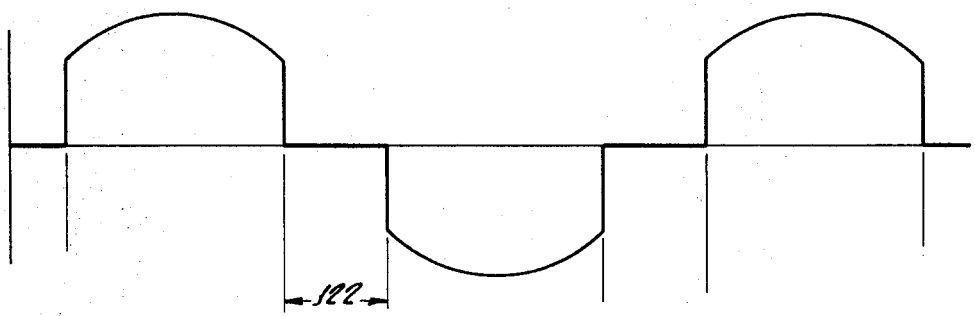
FIG. 7 is a plot of the output of the wave-shaping circuit with a given set of parameters with time.

With reference to FIGS. 5 and 7, the operation of the wave-shaping circuit 56 may be described. This circuit is a push-pull amplifier which is biased to conduct only when the voltage applied to its input is above a predetermined level. The transistors 114 and 116 operate as a push-pull pair to amplify the voltage induced on the secondary of the transformer 82, and the output of this amplifier circuit is connected to the primary of the transformer 84. The potentiometer 118 is connected between a negative voltage bus and ground, with the variable slider 120 connected to the center tap of the secondary of the transformer 82. By moving the slider 120 along the potentiometer 118 a negative voltage bias may be applied in series with the secondary of the transformer 82. Since the transistors 114 and 116 will become conductive from their collectors to emitters only when the potential of the base is more positive than that of the emitter, this negative bias in the secondary of the transformer 82 requires an equal but opposite positive induced voltage in the secondary of the transformer 82 before it can drive the transistors 114 and 116 into conduction. Therefore, the waveform which will be produced by this wave-shaping circuit 56 upon the primary of the transformer 84 is that which is shown in FIG. 7. Since the voltage induced in the secondary of the transformer 82, at which the transistors 114 and 116 will begin to conduct, may be adjusted by moving the slider 120 along the potentiometer 118, the time period between conductive pulses in the output wave shape, shown as 122 in FIG. 7, is also controllable by moving the slider 120. As shown in FIG. 5 the slider 120 is mechanically coupled to the variable resistors 76 and 78 such that, as the frequency is changed by changing the value of these resistors 76 and 78, the time period 122 is simultaneously changed. This mechanical coupling, as later explained, enables the cycloconverter to produce a voltage to frequency ratio which remains constant as the frequency is changed.

Figure 8:
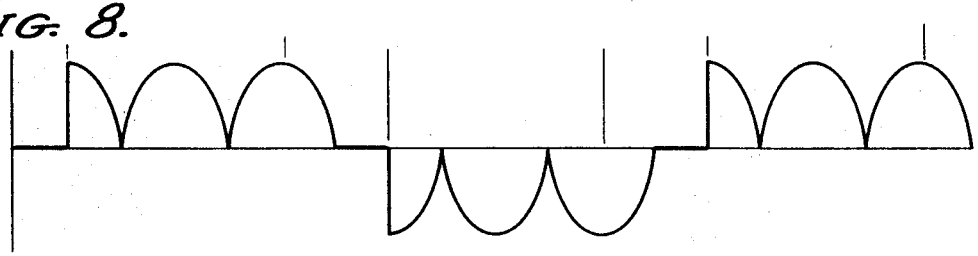
FIG. 8 is a plot of the voltage across the load with the wave-shaping circuit output as shown in FIG. 7 applied to the low frequency control circuits.
Figure 9:
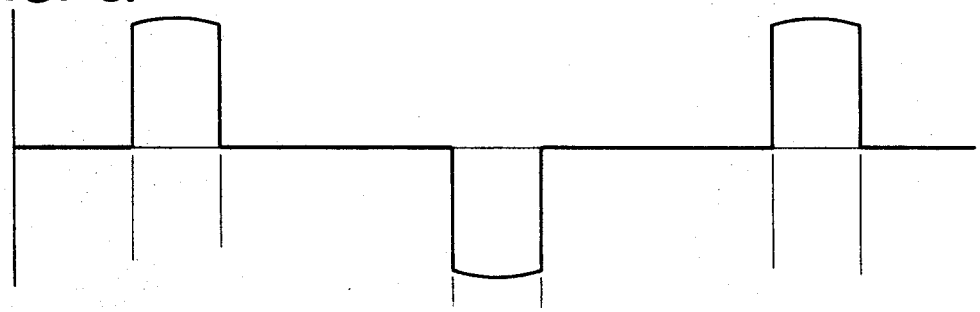
FIG. 9 is a plot of the same function as FIG. 7, with different parameters.
Figure 10:
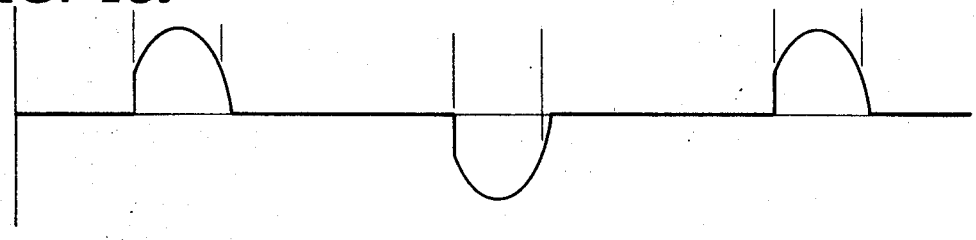
FIG. 10 is a plot of the same function as FIG. 8, with the wave-shaping circuit output as in FIG. 9.

When the wave shape shown in FIG. 7, rather than the normal sine wave, is induced in the secondaries of the transformer 84, the time during which the silicon controlled rectifiers 50, 92 94 and 96 will allow conduction of the silicon controlled rectifiers 16, 14, 20 and 22 is limited to that portion of the sine wave during which conduction occurs in the transistors 114 and 116. With this change, the waveform shown in FIG. 2a will now appear as that shown in FIG. 8, with the leading edge of the first half cycle after each polarity reversal being delayed. This change in input waveform to silicon controlled rectifier 50, 92, 94 and 96 results in a decrease in the effective output voltage of the cycloconverter. As was explained earlier, the final half cycle before each succeeding polarity reversal is not reduced since each of the silicon controlled rectifiers, once driven to conduction, will remain conducting until the current between its anode and cathode has reached a null point. If, however, the time period 122 of FIG. 7 is increased so that the trailing edge of the waveform occurs before the final half cycle before polarity reversal in FIG. 8 the waveshaping function will delete the entire last half cycle before polarity reversal and further reduce the effective output voltage of the cycloconverter, as shown in FIGS. 9 and 10.

Advantageously, the variable resistors 76, 78 are ganged with the potentiometer 118 so that both the frequency and voltage applied to the load 24 are varied simultaneously. As a result the output voltage of the cycloconverter can be changed with frequency. If the ratio of effective output voltage to frequency is designed to remain constant, and if this output is applied to an AC squirrel cage motor, the motor will develop constant rated torque regardless of the speed at which the motor is run. Frequency and wave-shaping control can also be accomplished with an electrical signal derived from a load parameter which is to be regulated—speed, pressure, position, current, etc.—and thus the cycloconverter can be used in both unregulated or in closed loop feedback control systems.

Figure 6:
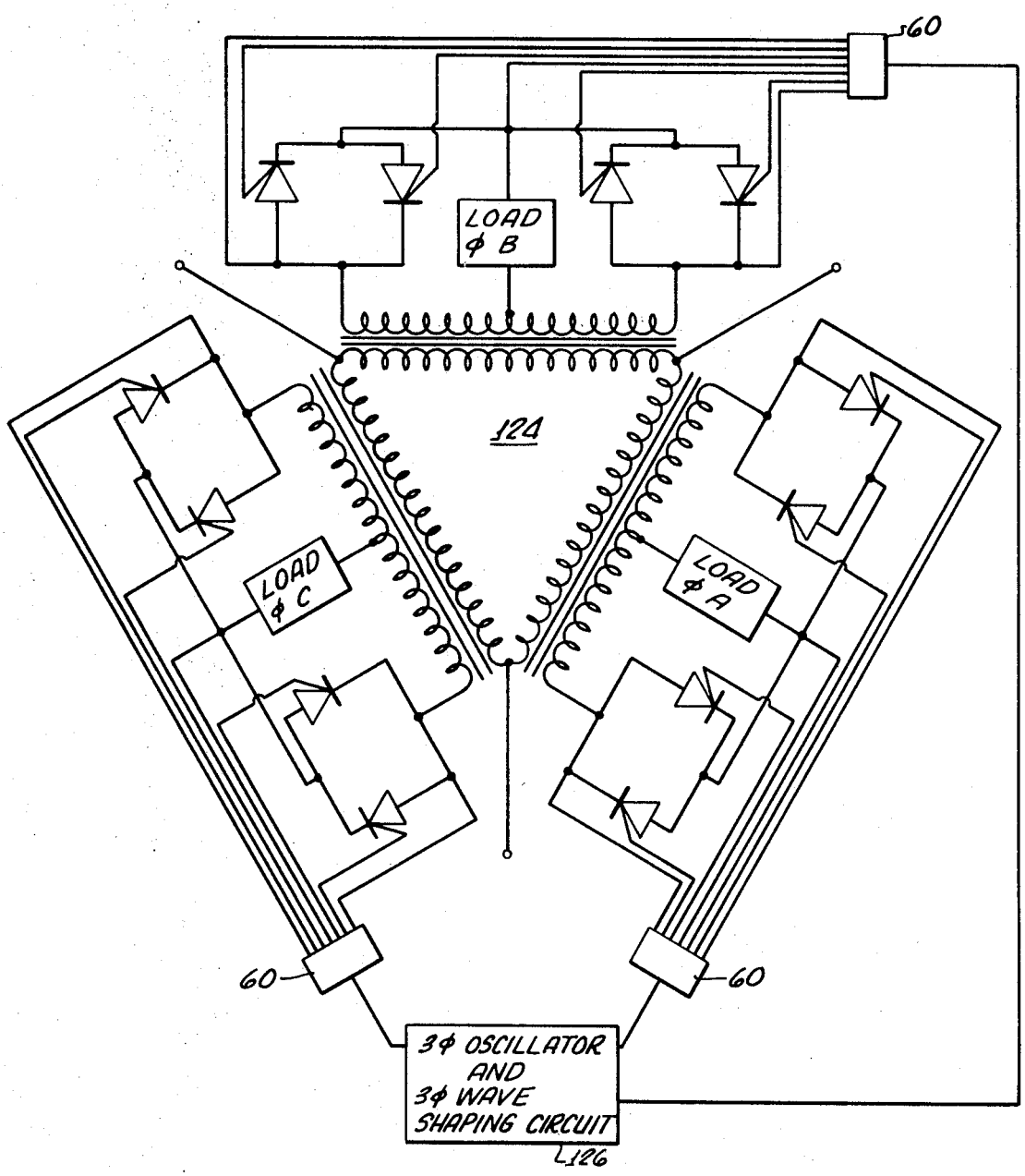
FIG. 6 is a schematic illustration of the present cycloconverter as adapted for three-phase applications.

Application of the present cycloconverter to three-phase or multiphase power sources is described with reference to FIG. 6. This FIGURE shows a three-phase power source which is connected to the primary of a delta transformer 124. This transformer drives three separate single-phase cycloconverters, each of which is identical to that used in the single-phase applications described earlier. The phase angle of the power induced on each of the three cycloconverters is separated by 120° as in any normal three-phase power circuit. In order to develop an output signal from the three cycloconverters in which the three phases are again separated by 120 electrical degrees, it is necessary that the control circuits for the separate cycloconverters produce gate energization which is separated by 120°. All of the control circuits 60 for the silicon controlled rectifiers in the multiphase application are the same as in the single-phase case, except that a multiphase, low frequency oscillator and wave-shaping circuit 126 is used to properly phase the cycloconverter outputs. The same oscillator circuit may be used as was used in the single-phase application by adding a single-phase to three-phase conversion circuit. Such conversion circuits are well known in the art. The three-phase wave-shaping circuit produces the same function on each phase as circuit 56 produces in the single-phase circuit. The outputs of these wave-shaping circuits are then connected to each of the gate circuits of the three cycloconverters.

This circuit, for multiphase applications, has the advantage that it requires no more silicon controlled rectifiers or control circuitry per phase than are required in the single-phase cycloconverter. Since prior-art cycloconverters attempted to combine in each of the three cycloconverters used in three-phase operation the signals from each of the input lines from the three-phase power source and to use the power source phase relationships to generate the cycloconverter output phase relationships, they required complex gate and timing circuits and additional silicon controlled rectifiers to combine phases. The present invention makes no attempt to combine the input phases but leaves them separated and generates its own phase relationships through the three-phase low frequency oscillator 126 and gate circuitry. The circuit is greatly simplified and the cost of components and circuitry is kept to a minimum.

I claim:

1. An apparatus for decreasing the frequency of an input alternating current signal from an external power source to produce an output alternating current signal of a lower frequency to drive a load, comprising:
    a signal generator which produces a signal at said lower frequency;
    means for reversing the polarity of said input signal to produce said output signal, said means comprising:
        a first selectively energizable rectifying means connected in series with said input power source and said load, said first rectifying means being connected to prevent current flow from said power source to said load when said first rectifying means is deenergized, and to allow current to flow only in a first direction when sad first rectifying means is energized, said first direction current flow resulting in a first polarity across said load;
        a second selectively energizable rectifying means connected in series with said input power source and said load, said second rectifying means being connected to prevent current flow from said power source to said load when said second rectifying means is deenergized, and to allow current to flow only in a second direction when said second rectifying means is energized, said second direction current flow resulting in a second polarity across said load;
    self-energized triggering means for energizing said first rectifying means, said means being responsively coupled to the input signal applied to said second rectifying means so that (i) said first rectifying means is energized only when said second rectifying means is deenergized and (ii) the energizing power for said first rectifying means is derived directly from the alternating current input signal supplied by said external power source;
    self-energized triggering means for energizing said second rectifying means, said means being responsively coupled to the input signal applied to said first rectifying means so that (i) said second rectifying means is energized only when said first rectifying means is deenergized and (ii) the energizing power for said second rectifying means is derived directly from the alternating current input signal supplied by said external power source;
    means responsive to said signal generator and coupled between said means for energizing said first rectifying means and said first rectifying means for preventing energization of said first rectifying means when said signal produced by said signal generator has a first polarity; and
    means responsive to said signal generator and coupled between said means for energizing said second rectifying means and said second rectifying means for preventing energization of said second rectifying means when said signal produced by said signal generator has a second polarity, said second polarity being opposite said first polarity of said signal generator.

2. An apparatus defined in claim 1 wherein:
    said first rectifying means comprises a pair of silicon controlled rectifiers, the anodes of which are connected to said power source and the cathodes of which are connected to said load;
    said second rectifying means comprises a pair of silicon controlled rectifiers, the cathodes of which are connected to said power source and the anodes of which are connected to said load.

3. An apparatus as defined in claim 2 wherein said self-energizing triggering means for energizing said first and second rectifying means comprises:
    a first transformer connected to produce a potential between the gates and cathodes of the silicon controlled rectifiers of said first rectifying means only when a potential difference occurs between the anodes and cathodes of the silicon controlled rectifiers of said second rectifying means; and
    a second transformer connected to produce a potential between the gates and cathodes of the silicon controlled rectifiers of said second rectifying means only when a potential difference occurs between the anodes and cathodes of the silicon controlled rectifiers of said first rectifying means.

4. An apparatus as defined in claim 3 wherein said means for preventing energization of said first rectifying means comprises:

a first silicon controlled rectifier connected in series with said first transformer and said gates of said silicon controlled rectifiers of said first rectifying means, said first silicon controlled rectifier being connected to said signal generator for energization only when said signal generator produces a signal of a first polarity; and wherein said means for preventing energization of said second rectifying means comprises:

a second silicon controlled rectifier connected in series with said second transformer and said gates of said silicon controlled rectifiers of said second rectifying means, said second silicon controlled rectifier being connected to said signal generator for energization only when said signal generator produces an output signal of a second polarity, said second polarity being opposite to said first polarity.

5. An apparatus for decreasing the frequency of a three-phase alternating current input signal to produce an output three-phase alternating current signal of lower frequency to drive a three-phase load comprising:

a signal generator which produces a three-phase signal at said lower frequency, three polarity-reversing means coupled to said three-phase input signal for producing said three-phase output signal, each of said polarity reversing means comprising a first selectively energizable rectifying means connected to prevent current flow from one phase of said input signal to one phase of said load when said first rectifying means is deenergized, and to allow current to flow only in a first direction when said first rectifying means is energized, said first direction current flow resulting in a first polarity across one phase of said load;

a second selectively energizable rectifying means connected to prevent current flow from one phase of said input signal to one phase of said load when said second rectifying means is deenergized, and to allow current to flow only in a second direction when said second rectifying means is energized, said second direction current flow resulting in a second polarity across one phase of said load;

said first and second rectifying means of each of said polarity reversing means being coupled between respectively different phases of said input signal and the corresponding phase of said three-phase load so that each polarity reversing means independently controls the phase reversal of a respectively different one of the three phases of said input signal;

three independent energizing means respectively associated with said three polarity-reversing means, each of said energizing means including means for energizing the first rectifying means of its associated polarity-reversing means only when the second rectifying means thereof is deenergized, means for energizing the second rectifying means of its associated polarity-reversing means only when the first rectifying means thereof is deenergized;

three independent control means respectively associated with said three polarity-reversing means and responsively coupled to respectively different phases of the signal produced by said signal generator, each of said control means including means responsive to a single phase of said signal generator and coupled between the energizing means of the first rectifying means and the associated first rectifying means for preventing energization of the first rectifying means when the signal produced by said signal generator has a first polarity, and means responsive to the same phase of said signal generator and coupled between the energizing means of the second rectifying means and the associated second rectifying means for preventing energization of the first rectifying means when the signal produced by said signal generator has a second polarity, said second polarity being opposite of said first polarity of said signal generator.

6. The apparatus of claim 5 wherein said output frequency of said signal generator is selectively variable.

7. The apparatus of claim 5 wherein each of said polarity-reversing means includes a plurality of silicon controlled rectifiers respectively gated by the associated energizing means.

8. An apparatus for decreasing the frequency of a multiphase alternating current input signal to produce an output multiphase alternating current signal of lower frequency to drive a multiphase load comprising:

a signal generator which produces a multiphase signal at said lower frequency, multiple polarity-reversing means coupled to said multiphase input signal for producing said multiphase output signal, each of said polarity-reversing means comprising a first selectively energizable rectifying means connected to prevent current flow from one phase of said input signal to one phase of said load when said first rectifying means is deenergized, and to allow current to flow only in a first direction when said first rectifying means is energized, said first direction current flow resulting in a first polarity across one phase of said load;

a second selectively energizable rectifying means connected to prevent current flow from one phase of said input signal to one phase of said load when said second rectifying means is deenergized, and to allow current to flow only in a second direction when said second rectifying means is energized, said second direction current flow resulting in a second polarity across one phase of said load;

said first and second rectifying means of each of said polarity-reversing means being coupled between respectively different phases of said input signal and the corresponding phase of said multiphase load so that each polarity-reversing means independently controls the phase reversal of a respectively different one of the multiple phases of said input signal;

multiple independent energizing means respectively associated with said multiple polarity-reversing means, each of said energizing means including means for energizing the first rectifying means of its associated polarity-reversing means only when the second rectifying means thereof is deenergized, means for energizing the second rectifying means of its associated polarity-reversing means only when the first rectifying means thereof is deenergized;

multiple independent control means respectively associated with said multiple polarity-reversing means and responsively coupled to respectively different phases of the signal produced by said signal generator, each of said control means including means responsive to a single phase of said signal generator and coupled between the energizing means of the first rectifying means and the associated first rectifying means for preventing energization of the first rectifying means when the signal produced by said signal generator has a first polarity, and means responsive to the same phase of said signal generator and coupled between the energizing means of the second rectifying means and the associated second rectifying means for preventing energization of the first rectifying means when the signal produced by said signal generator has a second polarity, said second polarity being opposite of said first polarity of said signal generator.

9. An apparatus for decreasing the frequency of an input alternating current signal from an external power source to produce an output alternating current signal of a lower frequency to drive a load comprising:

means for selecting the magnitude of said lower frequency including a selectively variable signal generator which produces a signal at said selected lower frequency;

means for reversing the polarity of said input signal to produce said output signal, said means comprising a first selectively energizable rectifying means connected in series with said input power source and said load, said first rectifying means being connected to prevent current flow from said power source to said load when said first rectifying means is deenergized, and to allow current to flow only in a first direction when said first rectifying means is energized, said first direction current flow resulting in a first polarity across said load;

a second selectively energizable rectifying means connected in series with said input power source and said load, said second rectifying means being connected to prevent current flow from said power source to said load when said second rectifying means is deenergized, and to allow current to flow only in a second direction when said second rectifying means is energized, said second direction current flow resulting in a second polarity across said load;

triggering means responsive to said signal generator and operatively coupled to said first and second selectively energizable rectifying means for energizing either said first or said second selectively energizable rectifying means;

means for varying the voltage of said output alternating current signal as a function of the frequency of said output signal, said means being responsively coupled to said means for selecting the magnitude of said lower frequency and operatively coupled to said triggering means for limiting the portion of each half cycle of said lower frequency during which said rectifying circuits are energized by said triggering means.

10. The apparatus of claim 9 wherein said means for limiting comprises:

an amplifier, coupled to said low frequency generator, said amplifier connected to energize said first and second rectifying circuits, and biasing means for preventing said amplifier from energizing said first and second rectifying means when said low frequency generator produces an output signal below a given voltage.